United States Patent [19]

Loce et al.

[11] Patent Number: 4,678,311

[45] Date of Patent: Jul. 7, 1987

[54] MULTI-MAGNIFICATION SHORT FOCAL LENGTH IMAGING SYSTEM

[75] Inventors: Robert P. Loce, Webster; Melvin E. Deibler, Williamson, both of N.Y.

[73] Assignee: Xerox Corporation, Stamford, Conn.

[21] Appl. No.: 839,666

[22] Filed: Mar. 14, 1986

[51] Int. Cl.⁴ .............................................. G03B 27/00
[52] U.S. Cl. ............................................ 355/1; 355/46
[58] Field of Search ................... 354/112, 123; 355/46, 355/1

[56] References Cited

U.S. PATENT DOCUMENTS

| | | | |
|---|---|---|---|
| 4,394,083 | 7/1983 | Rees | 355/1 |
| 4,459,010 | 7/1984 | Hinton et al. | 355/1 X |
| 4,542,983 | 9/1985 | Zambelli et al. | 355/1 X |
| 4,595,275 | 6/1986 | Sonobe | 355/1 X |

Primary Examiner—Richard A. Wintercorn

[57] ABSTRACT

A multi-magnification, short focal length imaging system is enabled by providing a lens assembly having a plurality of short focal length lens arrays formed within a unitary plastic or glass body. The lens arrays are composed of a plurality of lenslets formed by either a masking/radiation heat treating process when using a photosensitive glass or by plastic injection molding techniques. The lenslets are formed with the appropriate spacing parameters and lens axis tilt orientation to enable projection of a reduced or enlarged image of a document at an image plane. The lens assembly is translated and/or rotated in response to magnification reproduction values selected by an operator so as to place the appropriate lens array into an optical projection path.

9 Claims, 11 Drawing Figures

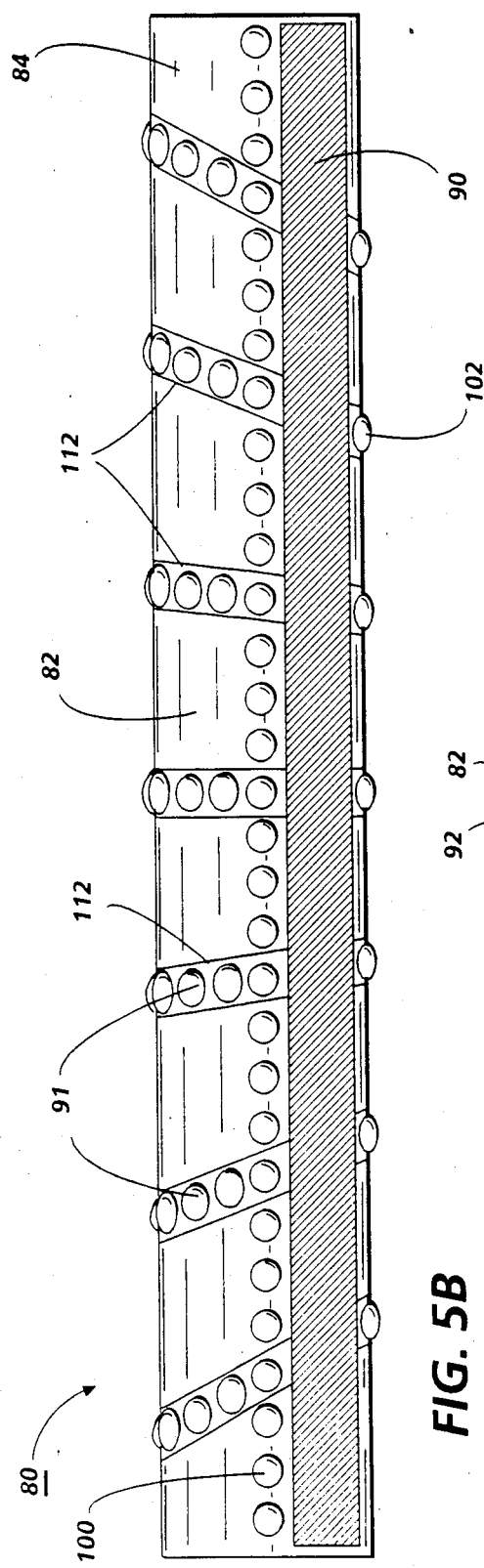
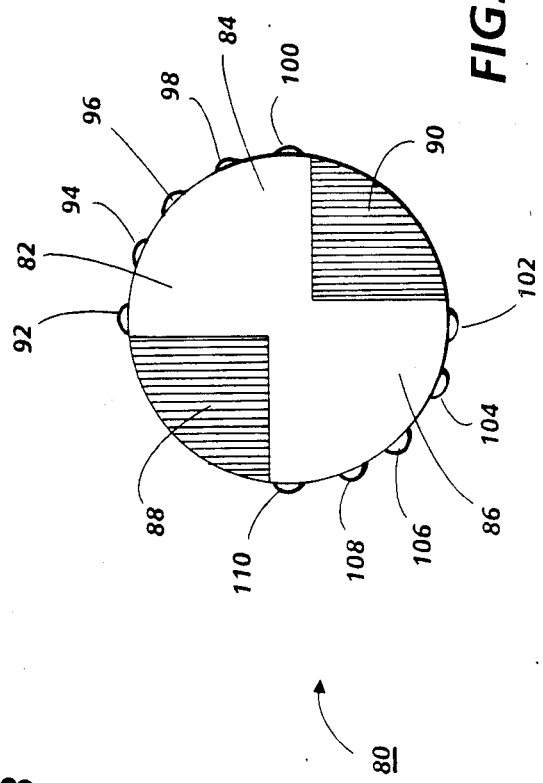
FIG. 5A
FIG. 5B

MULTI-MAGNIFICATION SHORT FOCAL LENGTH IMAGING SYSTEM

BACKGROUND AND INFORMATION DISCLOSURE STATEMENT

The present invention relates to a short focal length imaging system and, more particularly, to a lens assembly incorporating a plurality of rows of lenses, each lens row associated with a different magnification value.

The increasing use of compact, desk-type electrophotographic document reproduction machines has at least partially been enabled by the use of optical imaging systems having relatively short total conjugates; e.g. under 100 mm. One example is the use of a strip lens in an imaging system of the type described in U.S. Pat. Nos. 3,584,950 and 3,584,952. As shown in these patents, three lens strip elements, each element containing a plurality of refracting lenslets, are coaxially aligned to form a three lenslet assembly having a total conjugate of approximately 64 mm. With this lens design, exact alignment of the lenslets to achieve a 1:1 erect imaging on a photosensitive surface has proven difficult to achieve. The strip lens design also requires additional optical baffles between lenses to eliminate crosstalk.

A second example of a short focal length imaging device is disclosed in U.S. Pat. Nos. 3,947,106 and 3,977,777. As disclosed in these patents, a plurality of gradient index optical fibers are bundled together to form a linear projection lens. This gradient index lens array, known as a SELFOC lens (mark registered in Japan and owned by Nippon Sheet Glass Co., Ltd.) has found use in a number of commercial document reproduction devices as a replacement for the conventional lens/mirror optical systems.

A third example of a short focal length imaging system is disclosed in EPO Publication No. 0133788 published on Mar. 6, 1985 and in U.S. Pat. No. 4,488,864. The lens array of this system comprises a photosensitive soft glass which is exposed, on opposed surfaces, to collimated ultraviolet light through an apertured mask. Following a subsequent heat treatment, small, spherical thick lenses are formed at the surfaces of the glass, the lenses arranged in a row to create a lens array that functions as an image focusing device.

The prior art described in the above-identified patents discloses various embodiments of lens arrays which project erect images, at unity magnification, of documents when the lens is placed along an optical axis between a document and an image plane. It is known, according to U.S. Pat. No. 4,331,380, that a gradient index lens array can be designed so as to enable image projection at magnification ratios other than unity. In the '380 patent, there is further disclosed a particular document imaging embodiment wherein a conventional 1:1 gradient index lens array is combined with a reduction/enlargement gradient index lens array to form a lens assembly which, depending on its positioning in the optical path, reproduces a document at either 1× magnification or at some reduced or enlarged magnification. It is further known, through copending application Ser. No. 839,667 filed on Mar. 14, 1986 that a thick lens array of the type described in the EPO publication can be formed so as to enable a thick lens type of lens array to have magnification properties. Application 839,667, in its entirety, is hereby incorporated by reference.

These prior art lens arrays, except for the array disclosed in the '380 patent, are limited in that they do not provide a user with more than one magnification option. It would be desirable to utilize a short focal length lens assembly which incorporates, within a common structure, a plurality of lens arrays each lens array associated with a different magnification. The present invention is therefore directed to an optical system for an electrophotographic reproduction machine including a short focal length lens assembly for projecting an image of a document at an object plane along an optical path onto a photosensitive image plane, said lens assembly comprising a plurality of linear lens arrays, each lens array associated with a specific magnification value, each lens array formed as an integral part of said lens assembly and means for incrementally illuminating a document and for directing the reflected image into a selected one of the lens arrays whereby the illuminated portion of the document is projected onto the photosensitive image plane at the magnification value of the selected lens array. In a first embodiment, the lens arrays are integrally formed within the body of a planar glass member. In a second embodiment, the lens arrays are formed within the body of a generally cylindrical, partly opaque, glass body.

FIG. 1b is a sectional end view of the assembly of FIG. 1a.

FIG. 1c is a partial top view of the assembly of FIG. 1a.

FIG. 3b shows a sectional side view of the assembly of FIG. 3a.

FIG. 3c shows a partial top view of the assembly of FIG. 3a.

FIG. 5a is an end view of a circular, short focal length lens assembly.

FIG. 5b is a side view of the assembly of FIG. 5a.

Figure 1A:
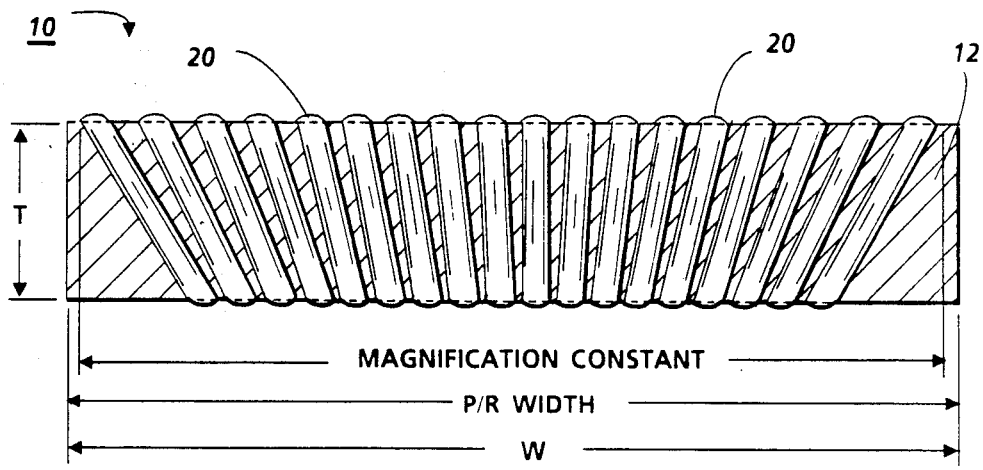
FIG. 1a is an end view of a planar short focal length lens assembly according to the invention.
Figure 1B:
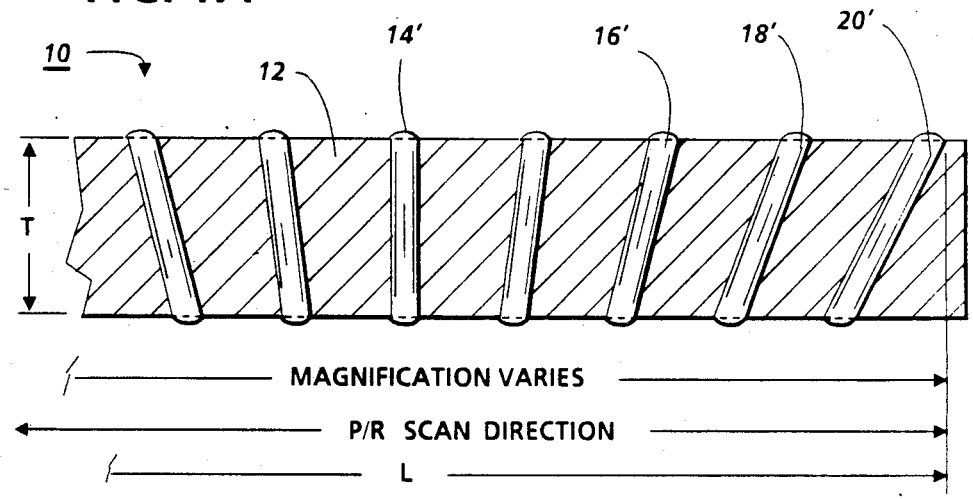
Figure 1C:
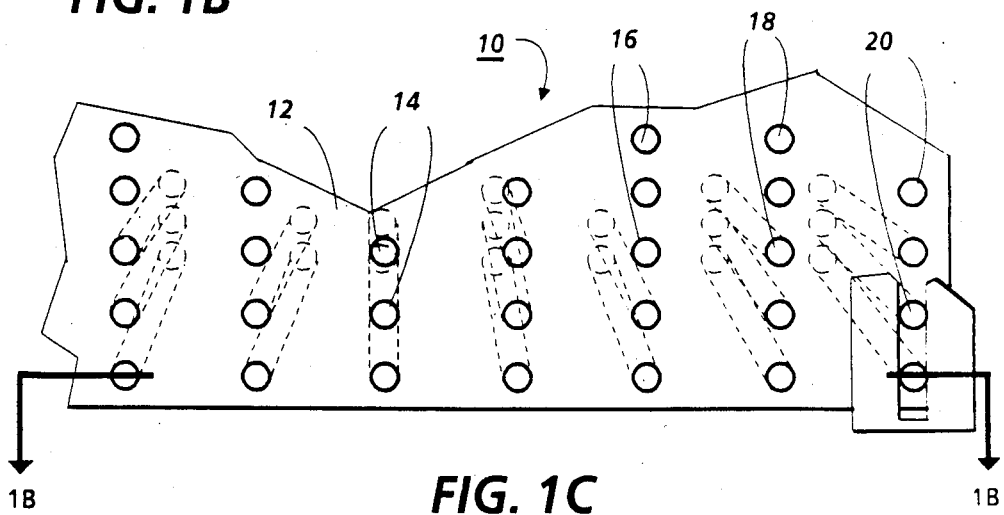

Referring to FIG. 1, there is shown a unitary, multiple magnification short focal length lens assembly 10. The lens assembly comprises a unitary planar glass body 12 having formed within its bulk, a plurality of lenslets 14 extending through the thickness dimension of body 12 and aligned in rows extending across the width dimension of body 12. Only several representative rows of lenslets are shown but the entire surface may be so covered. Lenslets 14 are aligned along a first row to form a first lens array 14'. Lens array 14' is formed as a 1× array, in a preferred embodiment, by using the masking and heating techniques disclosed in the EPO publication. Rows 16', 18', 20' each comprise a plurality of lenslets 16, 18, 20, respectively. The optical axes of these lenslets are tilted with respect to each other as shown more clearly in outermost row 20. Each of these rows is formed, in the preferred embodiment, according to the principles set forth in copending Application Ser. No. 839,667 to provide for a specific magnification value. As an example, row 16 has a 0.8 reduction value, row 18, a 0.7 reduction value, and, row 20, a 0.5 reduction value. Each lens array also has a reciprocal enlargement value when the lens assembly is inverted; e.g. lens 18, when inverted, has an enlargement value of 1.414.

Since the lens array rows are formed by directing light through appropriate mask apertures, each row may be positioned directly adjacent its neighbor and body 12 will therefore have a plurality of rows, each row having a magnification which is constant in the w direction but with the magnification varying in the l (length) direction. The multiple lens array of FIG. 1 can then be utilized in an imaging system represented by the document scanning optical system shown in FIG. 2.

Figure 2:
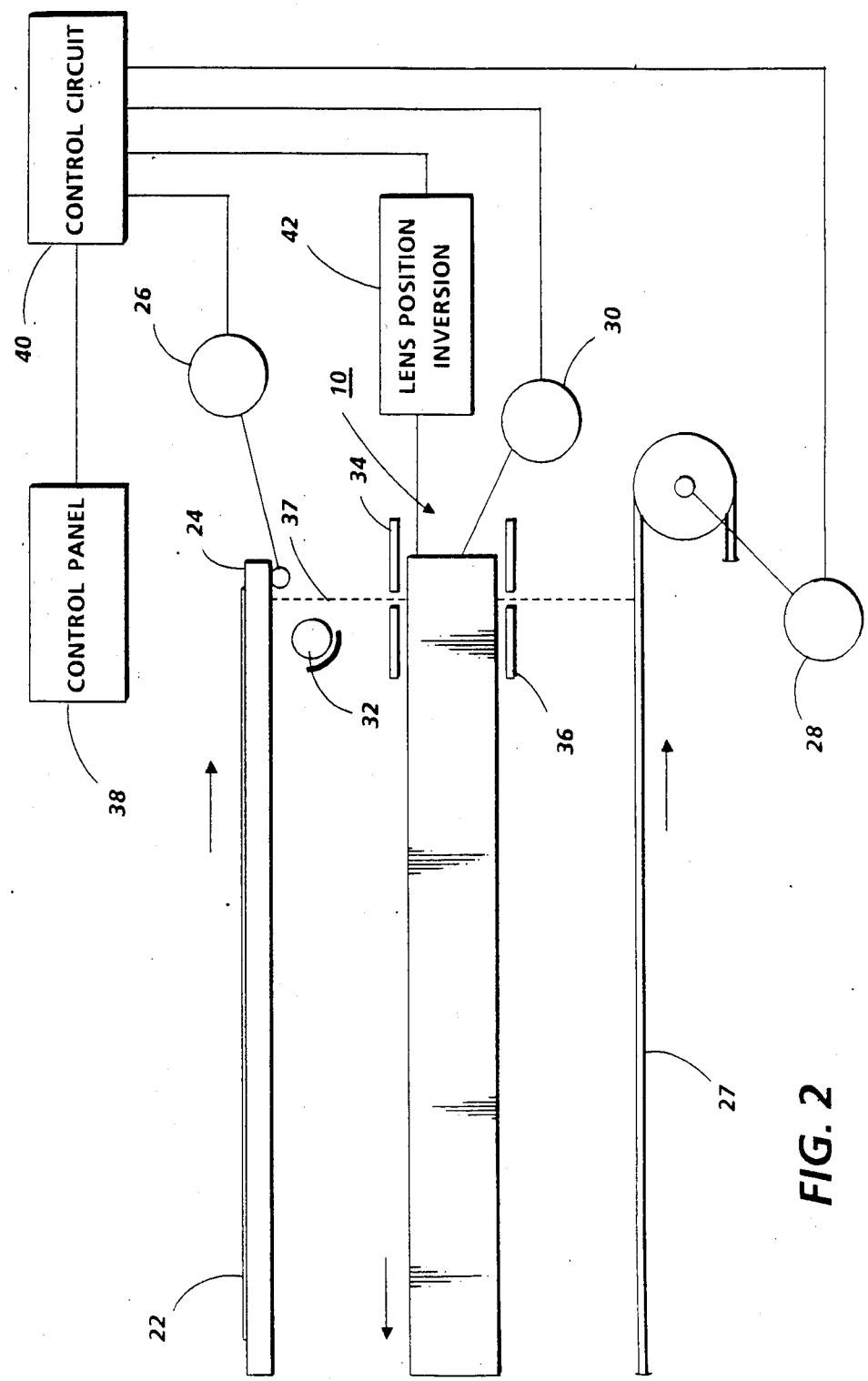
FIG. 2 shows the lens of FIG. 1 used as the projection lens in a document scanning system.

Referring to FIG. 2, a document 22 is placed on a platen 24 which is movable along a horizontal plane during a scanning operation by a suitable drive means such as reversible drive motor 26. The platen movement during a scanning operation is in the indicated direction. A portion of an endless photoreceptor belt 27 lies in a plane which is parallel to the plane of platen 24. Belt 27 is driven by a suitable drive means such as motor 28 in the indicated (clockwise) direction. Lens assembly 10 is positioned between platen 24 and belt 27 and is movable in a horizontal direction by reversible drive motor 30. An elongated lamp/reflector assembly 32 is adapted to provide a narrow, longitudinally-extending illumination strip along the bottom of platen 24. Shutter assemblies 34, 36 are fixed in position to allow only the reflected incremental images from the document to enter and exit a selected lens array row or along optical path 37. In practice, for improved radiometric efficiency, more than one row may be imaged if neighboring rows are close enough in magnification so that the total image is not substantially degraded.

In operation, a document 22 is placed on platen 24 and a magnification value is selected by the operator at control panel 38 generating a signal which is sent to control circuit 40. Assuming a 1:1 reproduction is desired, a signal is generated by circuit 40 and sent to motor 30. Motor 30 moves lens assembly 10 in a horizontal direction until row 14 (the 1:1 magnification row) is placed along optical path 37 in an imaging position. Platen 24 is then moved to the right by motor 26 under the control of circuit 40, bringing successive incremental portions of the document past the narrow illumination band created by illumination assembly 32. Light is reflected from the document and admitted by shutter assembly 34 to the entrance face of lens array row 16. The array projects the reflected image, at unity magnification, onto the photosensitive surface of belt 27. Belt 27, at 1× magnification, is moving at the same speed as platen 24. At the end of the scan excursion of platen 24, when the entire document has been conveyed past the illuminated strip, a complete latent image of the document has been formed on the surface of the belt. This latent image is subsequently developed and transferred to an output record medium using xerographic processes well known in the art.

If a document is to be reproduced at a magnification other than unity, an operator selection is made at control panel 38 which has switches (not shown) corresponding to the magnification values of the lens arrays formed on the lens array assembly. The switch selection generates a signal which is sent to control circuit 40 which, in turn, sends a signal to motor 30 driving the lens assembly to the position where the lens array with the selected magnification value is positioned in the optical path. Control circuit 40 also provides signals to motor 26 to vary the scan speed of platen 24 (increasing the speed for a reduction or decreasing the speed for an enlargement). Some changes in the vertical position of the lens assembly may be required to maintain total conjugate requirements. Accordingly, control circuit is adapted to also provide signals to a lens assembly vertical positioning and inverting means 42 which moves the lens to a new vertical position and also rotates the lens assembly if a reciprocal magnification function has been selected.

Figure 3A:
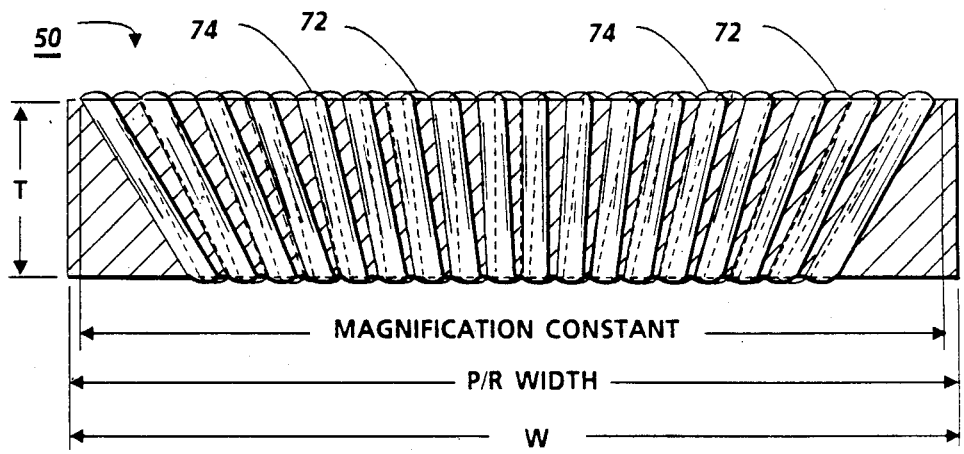
FIG. 3a is an end view of a second embodiment of a planar lens assembly with each lens array comprising two staggered rows.
Figure 3B:
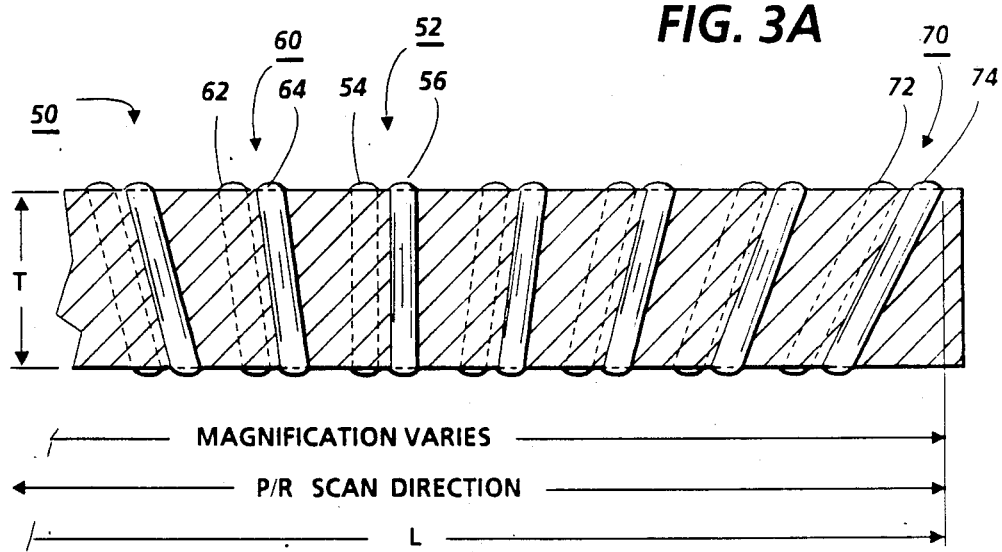
Figure 3C:
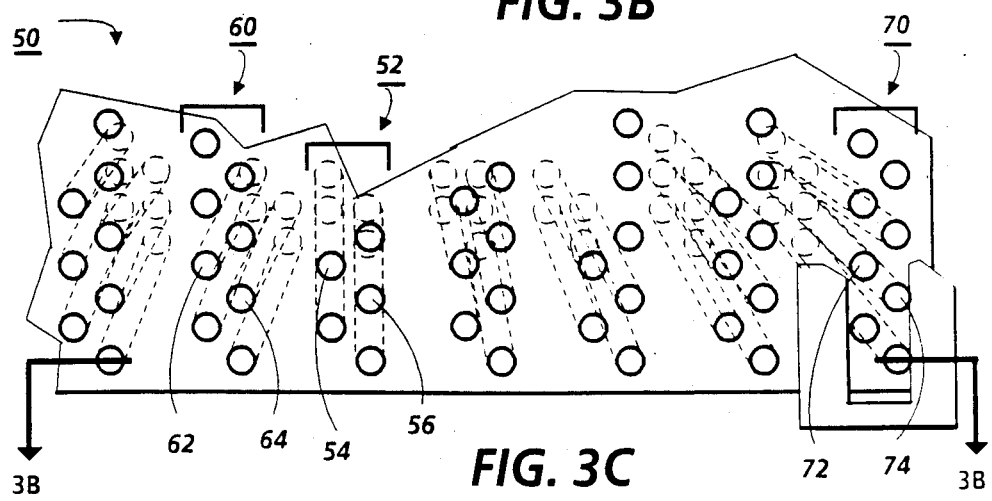

The lens assembly shown in FIG. 1 is formed with single row lens arrays each row having its own specific magnification. Image quality in a system such as the one shown in FIG. 2 may be improved by forming lens arrays with more than one row. A preferred embodiment would be to form groupings of several rows adjacent to each other, each row designed for the same magnification and conjugate. This embodiment is shown in FIG. 3. As shown, lens assembly 50 comprises rows of lenslets, with groups of two rows combined to produce a plurality of staggered two-row lens arrays. Thus, 1× lens array 52 comprises identical rows 54, 56; 0.7 lens array 60 comprises rows 62, 64; and 0.5× lens array 70 comprises rows 72, 74. As shown, each of the rows must have a slight degree of tilt between their axes to produce the overlapping images which contribute to higher resolution, and hence, better image quality. If lens assembly 50 is used in the imaging system of FIG. 2, shutter widths are adjusted (widened) accordingly to accommodate the additional rows of lenslets.

Figure 4:
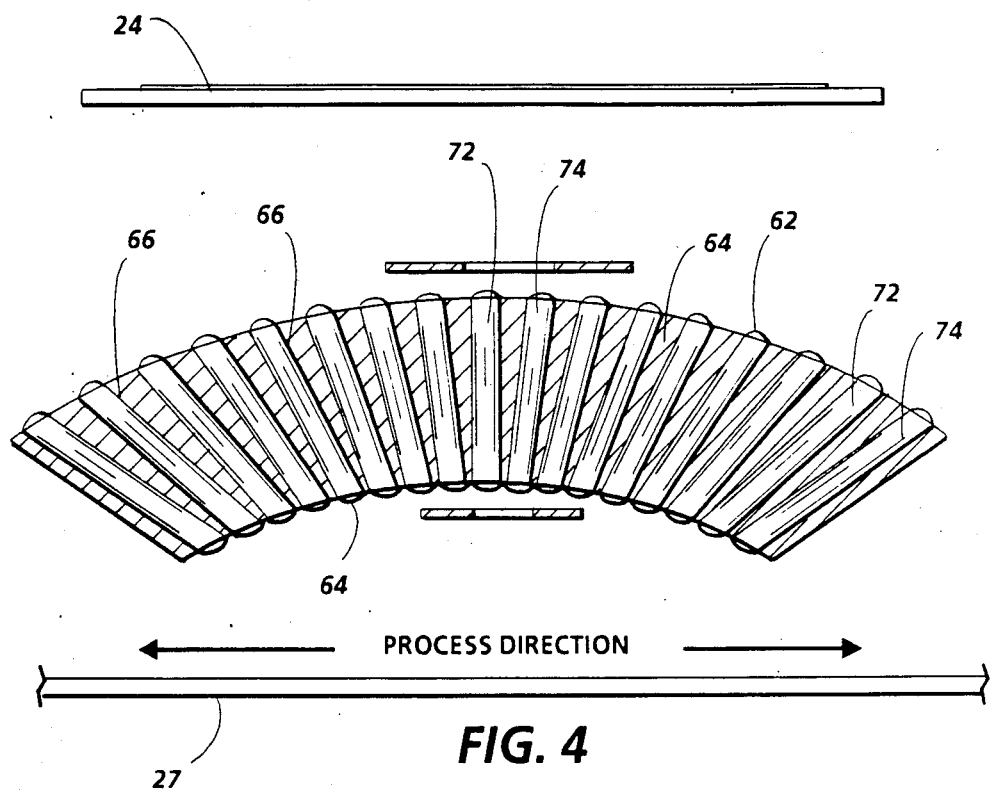
FIG. 4 is a variation of the FIG. 3 embodiment wherein the lens assembly is curved rather than planar.

FIG. 4 shows a curled shell variation of the planar embodiment of lens assembly 10 wherein the glass body is replaced by a flexible plastic material which is formed into a curved orientation. For this embodiment, plastic body 76 is formed as a mold. Lenslets 64 are formed in an integrated molding process by introducing a clear heated plastic into the mold to form rows 76. Rows in the middle of the assembly are already perpendicularly oriented with respect to the object and image planes 24, 27. If row pairs are selected towards the array ends, the assembly is simultaneously translated and rotated so that the axes of the end row pairs 72, 74 are in generally perpendicular orientation between the object and image planes. The center element of the magnification row must be perpendicular to the image plane. This embodiment eliminates off-angle ray entry (keystoning effect) inherent in the FIG. 2 embodiment for the row pairs at the array ends.

Turning now to a further embodiment of the present invention, FIG. 5 shows a generally cylindrical, multimagnification lens array assembly 80. FIG. 5a shows an end view and FIG. 5b shows a side view. The assembly comprises a generally cylindrical glass or plastic body 82 divided into two optically transparent quadrants 84, 86 and two opaque quadrants 88, 90. The transparent quadrants 84, 86 have a plurality of spherical (or aspherical) imaging elements 91 arranged to form five rows 92, 94, 96, 98, 100 (in quadrant 84) and five rows 102, 104, 106, 108, 110 (in quadrant 86). Each row extends along the length of the cylinder and is aligned with a row in the opposite quadrant to form a thick lens array having an inverted image near the core of the cylinder. Each row pair is designed to work at a magnification determined by the lenslet spacing within a row, by lens curvature and distance between lens pairs and by the orientation of the cylinder when placed within an imaging environment. Row pairs 92, 102 have the smallest reduction ratio (0.5) and the largest enlargement ratio when inverted. The spacing between the lenslets which make up row 92 is the largest and between the lenslets of row 102 the smallest. The element spacing decreases from row 94 through row 100 and increases from row 104 through row 110. Row pair 100, 110 is the 1× magnification row, row pairs 94, 104, 96, 106, 98, 108 have reduction/enlargement values intermediate those of row pairs 92, 102 and 100, 110. Baffle plates 112 extend through quadrants 84, 86 to prevent cross-talk between elements in a row. The plates are perpendicular to the length of the cylinder at its center point but begin pivoting about the 100, 110 rows.

Only several representative baffles and lenslet elements are shown in FIG. 5 but it should be understood that the entire surface of the clear quadrants will be covered with lenslets 91. The interstitial areas between lenslets is made opaque to prevent stray light from entering the lenses. It will be appreciated that glass body 12 may not be completely circular as shown to obtain the proper thickness for each lenslet pair.

Figure 6:
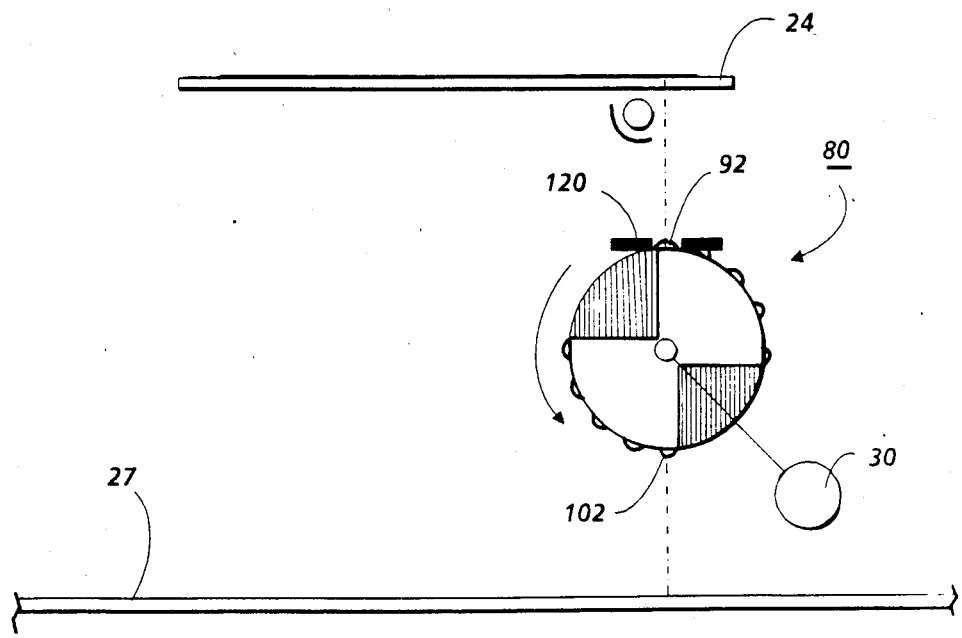
FIG. 6 shows the lens assembly of FIG. 5 used as the projection lens in a document scanning system.

Lens assembly 80 like assembly 10, is used in a document imaging system. FIG. 6 shows the basic imaging system of FIG. 2 with planar lens assembly 10 being replaced with cylindrical lens assembly 80. For this embodiment, signals from motor 30 will be translated into a rotary motion applied to assembly 80. As shown, assembly 80 has been rotated to align the 0.5 reduction row pair 92, 102 into the optical path. Instead of shutters 34, field masks such as black foam rubber segments 120 are in light contact with the face of the assembly. The mask remains stationary as the cylinder rotates to position row pairs selected by an operator changing magnification values at the control panel. Each row pair is designed to work at the same total conjugate so that the assembly can discretely zoom when changing magnification.

EXAMPLE

A design for a multi-magnification lens assembly is as follows:

| | |
|---|---|
| Total conjugate | 29.5 mm |
| 1 × element length "T" | 11.17 mm |
| 1 × element curvature "C" | 0.75 mm −1 |
| Element radius "R" | 0.76 mm |
| 1 × Object/image distance "t" | 9.15 mm |
| Maximum 1 × field height "k" | 1.87 mm |
| 1 × Spacing parameter "b" | 1.1 |
| 1 × Radiometric speed | .032 mm −1 |
| 1 × Depth of focus 40% MTF 24 cy/mm | .7 mm |
| 1 × MTF at 4 cy/mm | 40% |
| Number of possible magnifications | 21 Cl × reductions, 10 enlargements |
| Refractive index "n" | 1.5 |
| 1 × Irradiance Modulation | ~5% |

Although the present invention has been described with particularity relative to the foregoing detailed description of the exemplary preferred embodiments, various modifications, changes, additions and applications of the present invention, in addition to those mentioned herein will be readily apparent to those having normal skill in the art without departing from the spirit of this invention. As one example, although the planar lens assemblies are shown as thick lenses formed by the aforementioned masking and heating process, the assembly could also be formed of as a plurality of gradient index lenslets arranged into rows of lens arrays. As a further example, although the embodiments in FIGS. 2 and 6 incorporated an optical scanning system, the invention may be practiced in a print system wherein an image bar such as a light emitting diode (LED) may be addressed to produce a modulated light output which then represents document information transmitted to the entrance face of the lens assembly of the present invention. An example of an image bar used in conjunction with a linear array and to form images at a photoreceptor is contained in U.S. Pat. No. 4,424,524, whose contents are hereby incorporated by reference.

All of these various changes and modifications are intended to be embraced by the following claims:

What is claimed is:

1. An optical system for an electrophotographic reproduction machine including a short focal length lens assembly for projecting an image of a document along an optical path onto a photosensitive image plane, said lens assembly comprising a planar unitary light transmissive member having a plurality of linear iens arrays formed integrally within said member, each lens array formed to project an image therethrough at a specific magnification value, (each array formed as an integral part of said lens assembly) and means adapted to form a light radiation field containing document information and to direct said field into the entrance face of a selected one of said lens arrays whereby an image of the document is projected onto the photosensitive image plane at the magnification value of the selected lens array.

2. The optical system of claim 1 wherein said document is placed in an object plane and said forming means includes means for incrementally illuminating the document to produce the light reduction field.

3. The optical system of claim 1 wherein said forming means includes an addressable image bar having a modulated light output which corresponds to the light reduction field.

4. The optical system of claim 1 further including means for translating said lens assembly so as to position selected lens arrays in the optical path.

5. The optical system of claim 2 wherein said lens assembly has a generally curved configuration and wherein said translating means includes means for rotating said assembly.

6. The optical system of claim 1 wherein at least two lens array rows are positioned in the optical path so as to project a combined overlapping image of the light field onto the image plane.

7. The optical system of claim 6 wherein said at least two rows have the same magnification properties.

8. The optical system of claim 1 wherein said lens assembly has a generally cylindrical configuration having two opaque quadrants and two clear quadrants, said clear quadrants having said linear lens arrays formed therein.

9. The optical system of claim 2 further including shutter means positioned between said object plane and the entrance face of said lens array, said shutter means adapted to prevent non-image light from entering said entrance face.

* * * * *